US011348048B2

(12) United States Patent
Bhattacharya et al.

(10) Patent No.: US 11,348,048 B2
(45) Date of Patent: May 31, 2022

(54) METHOD AND SYSTEM FOR PRE-EMPTIVE DEVIATION DETECTION FOR TELECOM PROCESS FLOW USING DIGITAL TWIN

(71) Applicant: Tata Consultancy Services Limited, Mumbai (IN)

(72) Inventors: Kaustav Bhattacharya, Chennai (IN); Sankaranarayanan Viswanathan, Chennai (IN); Senthilvelan Natarajan, Chennai (IN); Arunkumar Sekar, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 170 days.

(21) Appl. No.: 16/971,637

(22) PCT Filed: Feb. 22, 2019

(86) PCT No.: PCT/IB2019/051456
§ 371 (c)(1),
(2) Date: Aug. 20, 2020

(87) PCT Pub. No.: WO2019/162894
PCT Pub. Date: Aug. 29, 2019

(65) Prior Publication Data
US 2020/0380434 A1 Dec. 3, 2020

(30) Foreign Application Priority Data
Feb. 23, 2018 (IN) .............................. 201821007022

(51) Int. Cl.
*G06Q 10/06* (2012.01)
*G06F 16/28* (2019.01)
(Continued)

(52) U.S. Cl.
CPC ....... *G06Q 10/0633* (2013.01); *G06F 16/254* (2019.01); *G06F 16/285* (2019.01);
(Continued)

(58) Field of Classification Search
CPC .......... G06Q 10/00–50/00; G06N 3/00–20/00; G06F 1/00–40/00; H04W 4/00–84/00
(Continued)

(56) References Cited

U.S. PATENT DOCUMENTS 9,439,092 B1 * 9/2016 Chukka ................. H04W 24/04
9,582,781 B1 * 2/2017 Kearns .................. G06F 16/355
(Continued)

OTHER PUBLICATIONS

Vachálek, Ján, et al. "The digital twin of an industrial production line within the industry 4.0 concept." 2017 21st international conference on process control (PC). IEEE, 2017. (Year: 2017).*
(Continued)

*Primary Examiner* — Alan S Miller
(74) *Attorney, Agent, or Firm* — Finnegan, Henderson, Farabow, Garrett & Dunner LLP

(57) ABSTRACT

A method and a system for pre-emptive deviation detection for a telecom process flow using digital twin. The proposed method and system pre-emptively detects critical failures in the telecom process flow even before they occur by pre-emptively detecting deviations based on digital twin. The proposed pre-emptive deviation is dynamically detected based on digital twin wherein, a simulated digital twin of telecom process flow is compared with a simulated predicted telecom process flow. Further based on pre-emptively detected deviation, notifications are displayed to execute preventive measures to ensure critical failures are avoided.

15 Claims, 13 Drawing Sheets

(51) Int. Cl.
*G06N 20/00* (2019.01)
*G06F 16/25* (2019.01)
*H04W 84/12* (2009.01)
*G06Q 50/32* (2012.01)

(52) U.S. Cl.
CPC ............ *G06N 20/00* (2019.01); *H04W 84/12* (2013.01); *G06Q 50/32* (2013.01)

(58) Field of Classification Search
USPC .............................................. 705/7.11–7.42
See application file for complete search history.

(56) References Cited

U.S. PATENT DOCUMENTS

| | | | |
|---|---|---|---|
| 2010/0082381 A1* | 4/2010 | Merrifield, Jr. .. | G06Q 10/06375 705/7.37 |
| 2018/0020015 A1* | 1/2018 | Munro ................ | G06F 21/552 |
| 2018/0129959 A1* | 5/2018 | Gustafson ............ | G06N 20/00 |

OTHER PUBLICATIONS

Graessler, Iris, and Alexander Pöhler. "Integration of a digital twin as human representation in a scheduling procedure of a cyber-physical production system." 2017 IEEE international conference on industrial engineering and engineering management (IEEM). IEEE, 2017. (Year: 2017).*

Leiva, Conrad. "Demystifying the digital thread and digital twin concepts." Industry Week 1 (2016): 2016. (Year: 2016).*

Toche, Boris, et al. "A framework to support collaboration during prototyping and testing." International Journal of Product Lifecycle Management 10.4 (2017): 348-374 (Year: 2017).*

Verdouw, C. N., and Jan Willem Kruize. "Digital twins in farm management: illustrations from the FIWARE accelerators SmartAgriFood and Fractals." Proceedings of the 7th Asian-Australasian Conference on Precision Agriculture Digital, Hamilton, New Zealand. 2017. (Year: 2017).*

International Search Report and Written Opinion for International Application No. PCT/IB2019/051456 dated Jul. 22, 2019 (1 page).

* cited by examiner

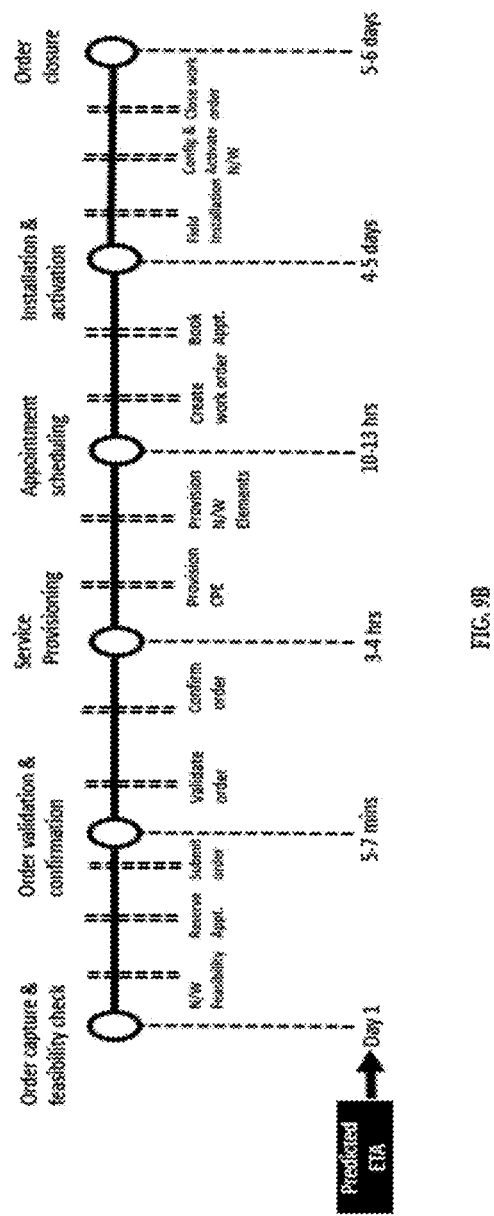

METHOD AND SYSTEM FOR PRE-EMPTIVE DEVIATION DETECTION FOR TELECOM PROCESS FLOW USING DIGITAL TWIN

CROSS-REFERENCE TO RELATED APPLICATIONS AND PRIORITY

This application is a U.S. National Stage Filing under 35 U.S.C. § 371 and claims priority from International Application No. PCT/IB2019/051456, filed on Feb. 22, 2019, which application claims from Indian Patent Application No. 201821007022, filed on Feb. 23, 2018.

TECHNICAL FIELD

The disclosure herein generally relates to field of process flow management and, more particularly to pre-emptive deviation detection for a telecom process flow using digital twin.

BACKGROUND

Process flow management is an essential feature for any business, but is especially critical for telecommunication market as telecommunication market is experiencing substantial changes with new business models, innovative services where technologies are reengineered and transformed at a drastic rate. Further telecom process flow management is operationally complex as it is highly customized and multifaceted, often entailing dozens of sub-processes that involve multiple systems, framework, models, departments, and partner organizations where any fallout during the execution of the process flow can directly impact revenues.

A digital twin is a virtual representation of a physical product or process, which aids in real-time understanding or for prediction of the physical counterpart's performance characteristics. The digital twins are used to simulate, predict, and optimize the product lifecycle of various products and production system. A digital twin is generally used for monitoring, diagnostics and prognostics in various applications that include aircraft engines, wind turbines, locomotives and buildings.

Considering a telecom market, tracking a telecom process flow and acting on a critical failure before they occur is challenging as the telecom market has a requirement for fast connectivity, smart devices and a variety customized digital services. Further existing systems in telecom market, have low real-time visibility or track a telecom process flow only after a fallout or when delays are complained against which results in an inefficient process, while a proactive and pre-emptive tracking of the telecom process flow would increase operational efficiency and decrease organizational chaos.

SUMMARY

Embodiments of the present disclosure present technological improvements as solutions to one or more of the above-mentioned technical problems recognized by the inventors in conventional systems. The embodiments herein provide a method and a system for pre-emptive deviation detection for a telecom process flow using digital twin. The proposed method and system pre-emptively detects critical failures in the telecom process flow even before they occur by pre-emptively detecting deviations based on digital twin. The proposed pre-emptive deviation is dynamically detected based on digital twin wherein, a simulated digital twin of telecom process flow is compared with a predicted telecom process flow. Further based on pre-emptively detected deviation, notifications are displayed to execute preventive measures to ensure critical failures are avoided.

In another aspect, a method for pre-emptive deviation detection for a telecom process flow using digital twin is provided. The method includes configuring a plurality of milestones for the telecom process flow based on a plurality of user inputs. The method further includes mapping the plurality of milestones with a plurality of internal and external datasets corresponding to a plurality of events of the telecom process. The method furthermore includes converting the mapped plurality of milestones into industry compliant data-model wherein industry compliant data-models include real time industry compliant data-models and historic industry compliant data-models. The method further includes creating a model and updating the model for the telecom process-flow based on real time industry compliant data-models. The method furthermore includes generating milestone specific predictive models based on the historic industry compliant data-models. The method further includes simulating the digital twin model for the telecom process-flow based on the milestone specific predictive models and real-time internal and external datasets. The method furthermore includes computing a deviation score based on difference between the digital twin model and the model for the telecom process-flow. The method further includes detecting a pre-emptive deviation based on comparison between the deviation score and a dynamic deviation threshold and finally the method includes displaying notifications & alerts based on the detected pre-emptive deviation.

In another aspect, a system for pre-emptive deviation detection for a telecom process flow using digital twin is provided. The system comprises a memory storing instructions and a centralized database, one or more communication interfaces; and one or more hardware processors coupled to the memory via the one or more communication interfaces, wherein the one or more hardware processors are configured by instructions for pre-emptive deviation detection for a telecom process flow using digital twin. Further the system comprises of a pre-emptive deviation detection unit for pre-emptive deviation detection for a telecom process flow using digital twin. Furthermore the system comprises the pre-emptive deviation detection unit which further comprises of various modules that include a configuration module for configuring milestones based on user inputs and mapping milestones with plurality of internal and external datasets corresponding to a plurality events of the telecom process. The system further comprises an input module that includes an external data source and an internal enterprise data for receiving plurality of datasets as input. The system further comprises an input ingestion module that further includes an Extract, Transform and Load (ETL) and a cluster tool for identifying, extracting, transforming and loading the mapped datasets into industry compliant data-model based on the telecom process flow and configured milestones. The system further comprises a tower-wise event storage, which is a database for storing industry compliant data-model, wherein industry compliant data-models include real time industry compliant data-models and historic industry compliant data-models. The system further comprises a process flow correlation engine that further includes a batch processor and a real-time processor for creating and dynamically updating an actual model for the telecom process-flow based on real time industry compliant data-models. The system further comprises a hybrid decision engine that further includes a model generator and a model repository for generating milestone specific predictive models and simulating a digital twin model for the telecom process-flow. The system further comprises a deviation detection module for computing a deviation score. The system further comprises a tower wise process flow state storage for saving the deviation status along with actual model and corresponding digital twin model. The system finally comprises an output module that further includes a maps, a dashboard, a notification generator and a recommendation generator for displaying notifications & alerts based on detected deviation score.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 9A, FIG. 9B, FIG. 9C and FIG. 9D illustrate use case examples for pre-emptive deviation detection for a telecom process flow using digital twin in accordance with some embodiments of the present disclosure.

Figure 1:
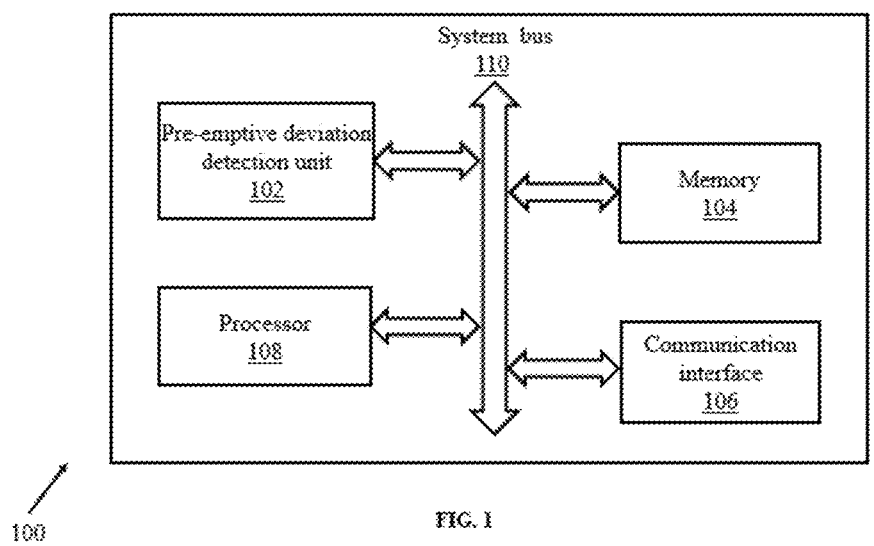
FIG. 1 illustrates an overview of an exemplary system for pre-emptive deviation detection for a telecom process flow using digital twin, according to an embodiment of present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Telecom process flow or telecommunication process flow is an operating model framework for telecom service providers in telecommunications industry that describes business processes, defines key elements and how the key elements should interact in order to ensure customer satisfaction. The telecom process flow comprises of multiple sub-telecom processes that include Order to Activate (O2A), Usage to Cash (U2C), Trouble to Repair (T2R), Lead to Order(L2O), wherein each sub-process refers to a specific stage such as O2A refers to a series of complex stages before a user receives a telecom product he has ordered, U2C refers to management(usage) of the services, T2R refers to resolving issues faced by a user while using a telecom product and L2O refers to generation, exploration, conversion till order for a product is placed. The telecom process flow that comprises of said multiple sub-telecom processes can be represented as distinct plurality of logical milestones with weighted priorities for each sub-telecom process. The logical milestones and weighted priorities can be configured based on enterprise parameters that include business, IT and network provisioning orchestration design. Further upon receiving a request from a user to track a work flow, process flow entities are used to represent a flow of the request through the telecom process to finally make their telecom flow towards completion.

The embodiments herein provide a method and a system for pre-emptive deviation detection for a telecom process flow using digital twin. The proposed method and system pre-emptively detects critical failures in the telecom process flow even before they occur by pre-emptively detecting deviations based on digital twin. The proposed pre-emptive deviation is dynamically detected based on digital twin wherein, a simulated digital twin of telecom process flow is compared with a simulated predicted telecom process flow. Further based on pre-emptively detected deviation, notifications are displayed to execute preventive measures to ensure critical failures are avoided.

Referring now to the drawings, and more particularly to FIG. 1 through FIG. 9D, where similar reference characters denote corresponding features consistently throughout the figures, there are shown preferred embodiments and these embodiments are described in the context of the following exemplary system and/or method.

FIG. 1 is a block diagram of a system 100 for pre-emptive deviation detection for a telecom process flow using digital twin, in accordance with an example embodiment. The system 100 includes a pre-emptive deviation detection unit 102 for pre-emptive deviation detection, in accordance with some embodiments of the present disclosure. The pre-emptive deviation detection unit 102 includes or is otherwise in communication with a memory 104, a communication interface 106, and a processor 108. The memory 104, communication interface 106, and the processor 108 may be coupled by a system bus 110 or a similar mechanism. Although FIG. 1 shows example components of rule relation mining unit 102, in other implementations, system 100 may contain fewer components, additional components, different components, or differently arranged components than depicted in FIG. 1.

The processor 108 may be implemented as one or more microprocessors, microcomputers, microcontrollers, digital signal processors, central processing units, state machines, logic circuitries, and/or any devices that facilitates in designing polymeric carrier for controlled release of molecules. Further, the processor 108 may comprise a multi-core architecture. Among other capabilities, the processor 108 is configured to fetch and execute computer-readable instructions or modules stored in the memory 104. The processor 108 may include circuitry implementing, among others, audio and logic functions associated with the communication. For example, the processor 106 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 108 thus may also include the functionality to encode messages and/or data or information. The processor 106 may include, among other things, a clock, an arithmetic logic unit (ALU) and logic gates configured to support operation of the processor 106. Further, the processor 106 may include functionality to execute one or more software programs, which may be stored in the memory 104 or otherwise accessible to the processor 108.

The memory 104, may store any number of pieces of information, and data, used by the system 100 to implement the functions of the system 100. The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Examples of volatile memory may include, but are not limited to volatile random access memory (RAM). The non-volatile memory may additionally or alternatively comprise an electrically erasable programmable read only memory (EEPROM), flash memory, hard drive, or the like. The memory 104 may be configured to store information, data, applications, instructions or the like for enabling the system 100 to carry out various functions in accordance with various example embodiments. Additionally or alternatively, the memory 104 may be configured to store instructions which when executed by the processor 108 causes the system 100 to behave in a manner as described in various embodiments.

The communication interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the communication interface (s) 108 may include one or more ports. One or more functionalities of the system 100 and components thereof, is further explained in detail with respect to block diagram described in FIG. 2.

Figure 2:
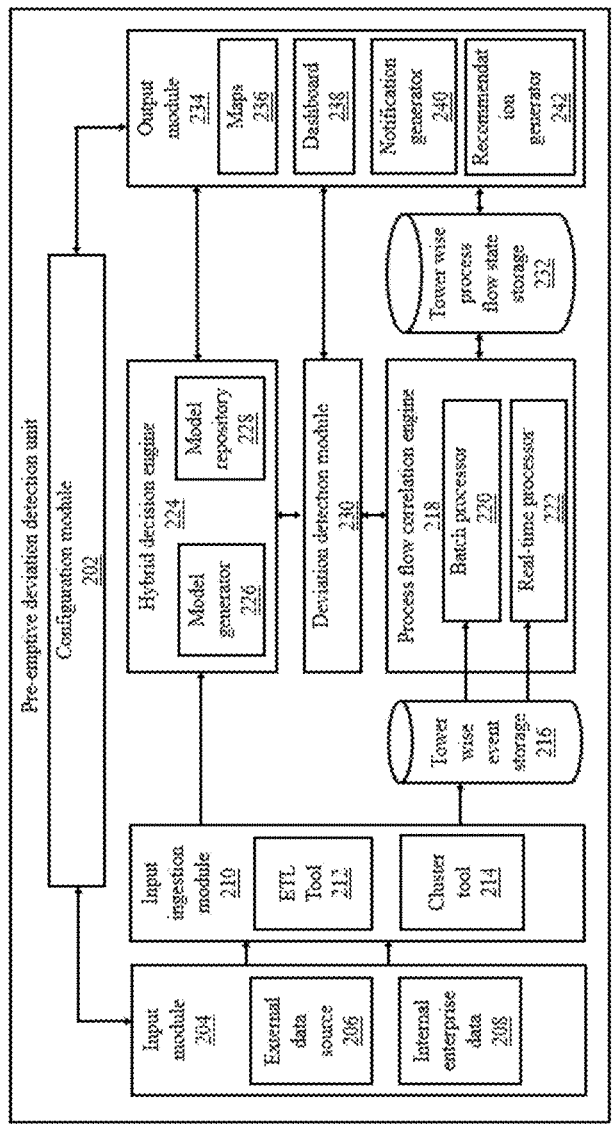
FIG. 2 is a functional block diagram of various modules stored in pre-emptive deviation detection unit 102 of the system of FIG. 1 in accordance with some embodiments of the present disclosure.

FIG. 2, with reference to FIG. 1, is a functional block diagram of the pre-emptive deviation detection unit 102 of the system 100 of FIG. 1 in accordance with an embodiment of the present disclosure. In an embodiment of the present disclosure, the pre-emptive deviation detection unit 102 comprises of various modules that include a configuration module 202 for configuring milestones based on user inputs and mapping milestones with plurality of internal and external datasets corresponding to a plurality events of the telecom process. The system further comprises an input module 204 that includes an external data cluster tool 214 input. The system further comprises an input ingestion module 210 that further includes an Extract, Transform and Load (ETL) 212 and a cluster tool 214 for identifying, extracting, transforming and loading the mapped datasets into industry compliant data-model based on the telecom process flow and configured milestones. The system further comprises a tower-wise event storage 216, which is a database for saving industry compliant data-model, wherein industry compliant data-models include real time industry compliant data-models and historic industry compliant data-models. The system further comprises a process flow correlation engine 218 that further includes a batch processor 220 and a real-time processor 222 for creating and dynamically updating an actual model for the telecom process-flow based on real time industry compliant data-models. The system further comprises a hybrid decision engine 224 that further includes a model generator 226 and a model repository 228 for generating milestone specific predictive models and simulating a digital twin model for the telecom process-flow. The system further comprises a deviation detection module 230 for computing a deviation score. The system further comprises a tower wise process flow state storage 232 for saving the deviation status along with actual model and corresponding digital twin model. The system finally comprises an output module 234 that further includes a maps 236, a dashboard 238, a notification generator 240 and a recommendation generator 242 for displaying notifications & alerts based on detected deviation score.

Figure 4:
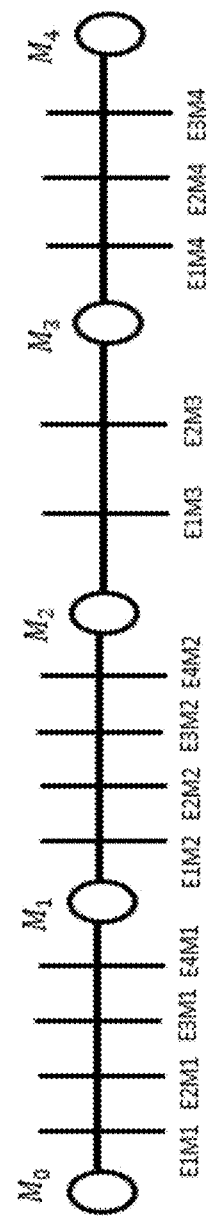
FIG. 4 illustrate use case examples of mapping of milestones with corresponding plurality events of telecom process, in accordance with some embodiments of the present disclosure.
Figure 5:
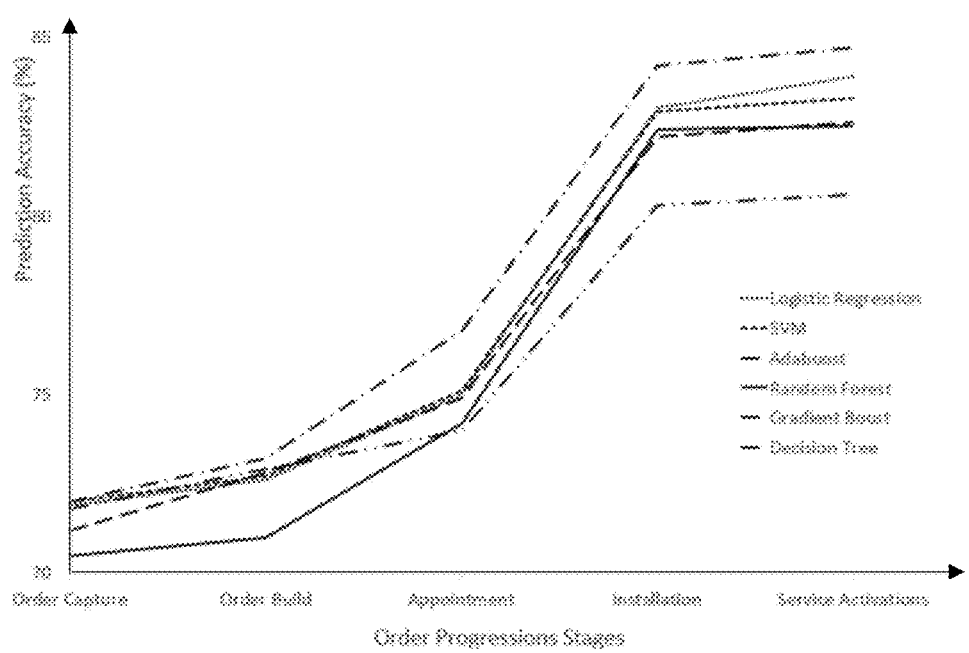
FIG. 5 illustrate a graph, for estimated time of arrival (ETA) at milestones based on supervised learning techniques, in accordance with some embodiments of the present disclosure.

According to an embodiment of the disclosure, the pre-emptive deviation detection unit 102 within system 100 further comprises the configuration module 202 for configuring milestones based on user inputs and mapping milestones with plurality of internal and external datasets corresponding to a plurality events of the telecom process. The configuration module 202 facilitates creation, modification of all telecom process flows and sub-telecom process by expressing them as logical milestones or milestones based on user inputs received by the output module 234. The configuration module 202 further maps milestones with plurality of external and internal datasets received by the input module 204 configured for receiving plurality of datasets as input. The input module 204 further includes an external data source 206 and an internal enterprise data 208, wherein the input datasets is received from plurality of sources that include raw application logs, infra monitoring data and the received input dataset can be of multiple formats that include comma-separated values (CSV), JavaScript Object Notation (JSON), Extensible Markup Language (XML), Avro and Parquet. The mapping of milestones with plurality of external and internal datasets is performed corresponding to a plurality events of the telecom process as shown in FIG. 4, wherein $M_j$ represents milestones and $E_iM_{j+1}$ represents events present in between $M_j$ and $M_{j+1}$ milestones (consecutive milestones).

According to an embodiment of the disclosure, the pre-emptive deviation detection unit 102 within system 100 further comprises the an input ingestion module 210 configured for identifying, extracting, transforming and loading (ETL) the mapped datasets into industry compliant data-model, wherein industry compliant data-model is of several standard formats that includes Shared Information and Data Model (SID) model. The input ingestion module 210 further includes the Extract, Transform and Load (ETL) 212 and the cluster tool 214, wherein mapped datasets are processed into industry compliant data-model based on the telecom process flow and configured milestones based on Extract, Transform and Load (ETL) techniques, statistical correlation and machine learning based unsupervised learning clustering techniques, wherein industry compliant events are clustered/classified based on telecom domain specific features that include infrastructure (IT and network), application stack, operations and process. In an embodiment, considering a use case example, for billing cycle study, events relating to Billing account number will be identified, ETL techniques performed followed by statistical correlation and machine learning based unsupervised learning clustering techniques and finally represented as industry compliant data-model (SID model). Further industry compliant data-models include real time industry compliant data-models and historic industry compliant data-models, which is further saved in a tower-wise event storage (216) database and later read by the batch processor (220) and the real-time processor (222) of the process flow correlation engine (218).

According to an embodiment of the disclosure, the pre-emptive deviation detection unit 102 within system 100 further comprises the process flow correlation engine 218 configured for creating and dynamically updating an actual model for the telecom process-flow based on real time industry compliant data-models. The process flow correlation engine 218 further includes the batch processor 220 and the real-time processor 222. The industry compliant data-models from tower-wise event storage (216) database and later read by the batch processor (220) and the real-time processor (222), wherein the batch processor (220) reads historic industry compliant data-models while the real-time processor (222) reads real time industry compliant data-models. Further the batch processor (220) upon reading historic industry compliant data-models, correlation analysis and aggregations is performed to determine the historic industry compliant data-models that is used for creating and dynamically updating an actual model for the telecom process-flow while the historic industry compliant data-models that cannot be used are discarded. Further the real-time processor (222) upon reading real time industry compliant data-models, correlation analysis and aggregations is performed to determine the real time industry compliant data-models that is used for creating and dynamically updating an actual model for the telecom process-flow while the real time industry compliant data-models that do not contribute towards the telecom process-flow are discarded. Further based on correlated, aggregated and selected industry compliant data-models (including historic & real time), the actual model is created and dynamically updated and further saved in the tower wise process flow state storage 232.

According to an embodiment of the disclosure, the pre-emptive deviation detection unit 102 within system 100 further comprises the hybrid decision engine 224 configured for generating milestone specific predictive models and further simulating the digital twin model for the telecom process-flow. The hybrid decision engine 224 further includes a model generator 226 for generating the digital twin model and a model repository 228 for saving the generated digital twin model.

Figure 6:
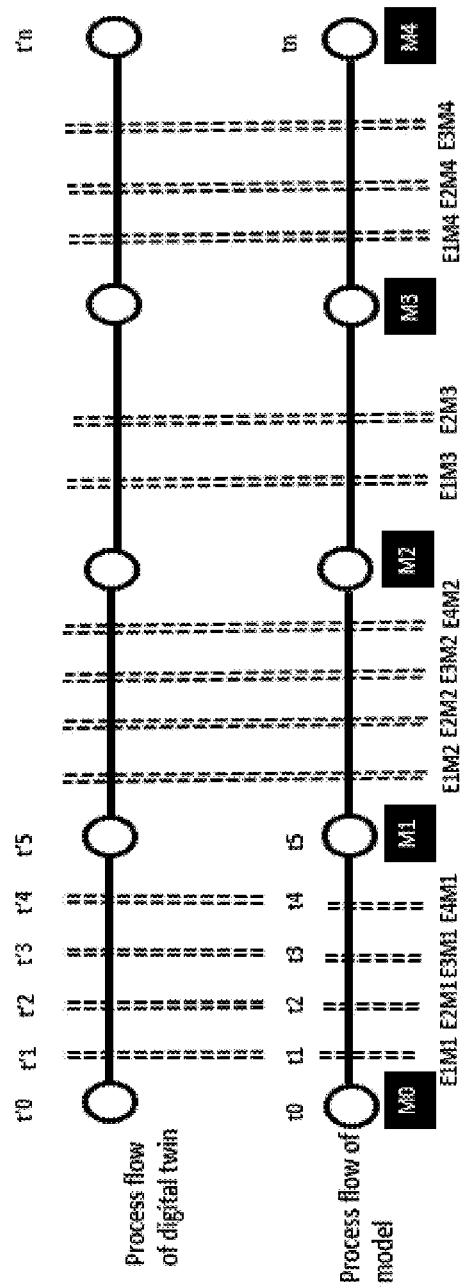
FIG. 6 illustrate use case examples, of simulation of a digital twin model for the telecom process-flow is simulated based on milestone specific predictive models and real time internal and external datasets, in accordance with some embodiments of the present disclosure.

The milestone specific predictive models are generated by predicting the estimated time of arrival (ETA) at milestones based on supervised learning techniques, creating process flow event clusters between subsequent milestones based on unsupervised learning techniques and finally predicting ETA for subsequent flow event clusters based on supervised regression techniques as shown in FIG. 6, wherein order progression stages is plotted against prediction accuracy. The milestone specific predictive models comprises of plurality of milestones and plurality of events between the plurality of milestones, wherein in an embodiment, $M_j$ represents milestones and $E_iM_{j+1}$ represents events present between $M_j$ and $M_{j+1}$ milestones (consecutive milestones). The milestones for milestone specific predictive models are generated based on supervised techniques that include Logistic Regression, Random Forest, Gradient Boost, Support Vector Machine, Decision Tree and Adaboost can be expressed as shown below;

$$R_{Mj}:T'_{Mj+1}=f(O_{Mj},T'_{Mj})$$

Where, $M_j$ is a milestone where i=1,2,3 . . . n $R_{Mj}$ is milestone specific predictive models at the milestone $M_j$ $T'_{Mj\_j}$ is predicted ETA at the milestone $M_j$ $O_{Mj}$ is sub-telecom processes attributes.

Further event clusters are generated for events between milestones in process flow entities based on unsupervised machine learning algorithms that include K-means, DB scan. Further supervised machine learning algorithms are applied to the milestones and events between milestones as the process flow entity progresses towards completion to determine the sub-process and further update estimated time of arrival (ETA) at subsequent milestones and event between milestones. The clusters thus generated for the events of the process flow between milestones can be expressed as;

$$CL_kE_iM_j=f([O_{EiMi},t'_{EiMj}])$$

Where, $E_i$ is an event between milestones M and $M_{j+1}$ where i,j=1,2,3 . . . n $CL_kE_iM_j$ is telecom process flow clusters at the event $E_i$ between the milestones $M_j$ and $M_{j+1}$ $O_{EiMj}$ is set of aggregated process flow entity datasets at milestones $M_j$ and $M_{j+1}$.

The event specific predictive models can be expressed as shown below;

$$R_{EiMj}:t'_{E(i+1)Mj}=f(O_{EiMi},t'_{EiMj})$$

Where, $E_i$ is an event between milestones $M_j$ and $M_{j+1}$ where i,j=1,2,3 . . . n $t'_{E(i+1)Mj}$ is ETA predicted at event $E_i$ under milestone $M_j$ $O_{EiMi}$ is sub-telecom processes attributes at $E_i$ under milestones $M_j$.

The digital twin model for the telecom process-flow is dynamically simulated based on milestone specific predictive models and real time internal and external datasets. Upon receiving a request from a user from output module 234 or based on configurations received from the configuration module 202 to simulate a digital twin for a telecom process flow the system gets triggered at defined intervals based on the position of the request at milestone level or at event level, thereby, updating the previously simulated milestone specific predictive models by dynamically associating the request to respective event clusters and predicting estimated time of arrival at subsequent events as shown in FIG. 6. The digital twin model is dynamically simulated based on real time internal and external datasets corresponding to a process flow entity by predicting the estimated time of arrival (ETA) at milestones based on supervised techniques, further creating process flow event clusters between subsequent milestones based on unsupervised techniques and finally predicting ETA for subsequent flow event clusters based on supervised regression techniques. The digital twin model thus simulated is stored in a tower wise process flow state storage 232, which is a database.

According to an embodiment of the disclosure, the pre-emptive deviation detection unit 102 within system 100 further comprises the deviation detection module 230 for estimating a pre-emptive deviation by computing a deviation score (δ) wherein the deviation score is computed based on difference between the digital twin model and the model for the telecom process-flow in the deviation detection module (230) which can be expressed as shown below;

$$\Delta_{EiMj} = t_{EiMj} - t'_{EiMj}$$

$$\delta_{EiMiCcMx} = \Delta_{EiMjCc} + \Sigma_{i=1; j=1}^{i=n; j=k} \Delta EiMj$$

Where,
$E_i$ is an event between milestones $M_j$ and $M_{j+1}$ where i,j=1,2,3 . . . n
$M_x$ is extrapolated milestone
$\Delta_{EiMj}$ is delta deviation at $E_i$ which is the event between milestones $M_j$ and $M_{j+1}$
$t_{EiMj}$ is ETA at $E_i$ which is the event between milestones $M_j$ and $M_{j+1}$
$t'_{EiMj}$ is actual time of arrival the $E_i$ is an event between milestones $M_j$ and $M_{j+1}$
$\delta_{EiMiCcMx}$ is extrapolated deviation at extrapolated milestone $M_x$ for a process flow at $E_i$ which is the event between milestones $M_j$ and $M_{j+1}$
Cc is sub-cluster of cluster C at $E_i$ which is the event between milestones $M_j$ and $M_{j+1}$.

Upon computing deviation score (δ), a pre-emptive deviation is estimated based on comparison between the deviation score (δ) and a dynamically computed deviation threshold (τ) in the deviation detection module (230). The dynamic deviation threshold C is dynamically based on deviation computation at event level, computation of extrapolation deviation based on known regression techniques at the subsequent milestones while considering weighted priorities of the subsequent milestones which can be expressed as shown below;

$$\tau_{EiMiCx} = \sum_{q=1}^{Q} \frac{\Delta EaMbPEq}{Q}$$

Where,
$\tau_{EiMiCx}$ is dynamically computed deviation threshold
$M_x$ is extrapolated milestone
PE is process flow entity
$E_i$ is an event between milestones $M_j$ and $M_{j+1}$ where i,j=1,2,3 . . . n
Cc is sub-cluster of cluster C at $E_i$ which is the event between milestones $M_j$ and $M_{j+1}$ with 'Q' entities.

Further the pre-emptive deviation is estimated based on comparison between the deviation score (δ) and the dynamically computed deviation threshold (τ) which can be expressed as shown below;

$$\delta \rightarrow \tau$$

Figure 7:
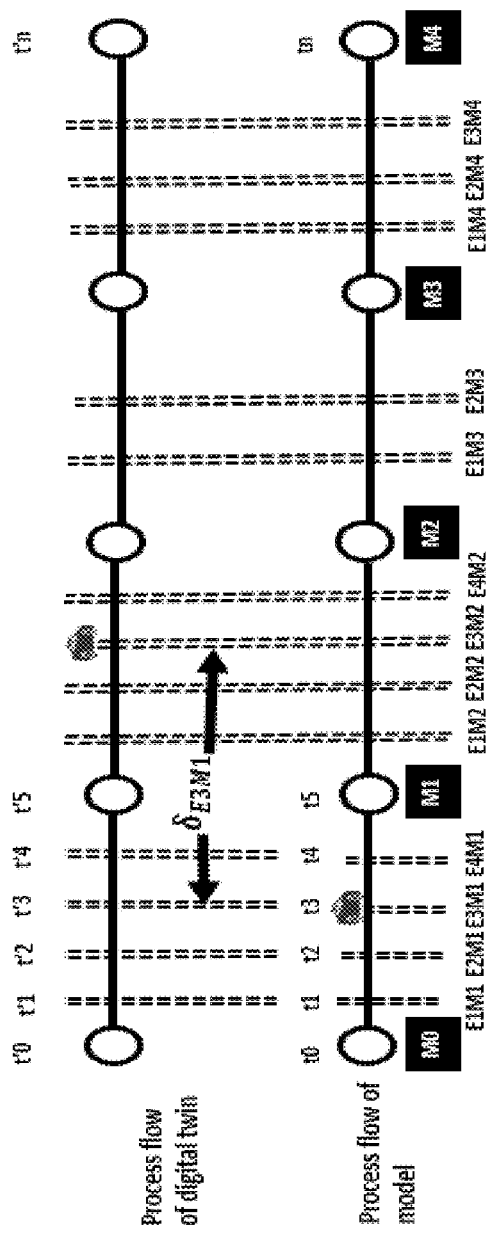
FIG. 7 illustrate use case examples, for pre-emptive deviation detection, in accordance with some embodiments of the present disclosure.

The FIG. 7 shows an illustration for pre-emptive deviation detection, wherein δ is computed and as the δ approaches the value of τ, notifications are triggered from notification generator 240 based on recommendations as recommended by recommendation generator 242, wherein recommendations are recommended based on several techniques that include user feedback, machine learning based techniques, rule-based notifications.

Figure 8:
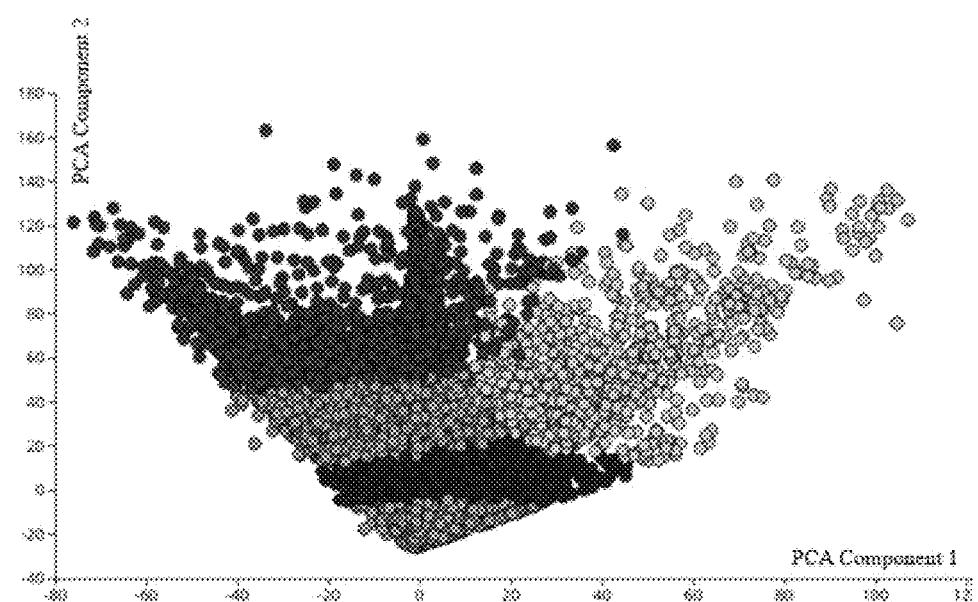
FIG. 8 illustrate a graph for cluster view of segmentation for telecom process flow based on their statistical likelihood across significant process flow milestones, in accordance with some embodiments of the present disclosure.

According to an embodiment of the disclosure, the pre-emptive deviation detection unit 102 within system 100 further comprises the output module 234 configured for displaying notifications & alerts based on deviation score. The output module 234 further includes a maps 236, a dashboard 238, a notification generator 240 and a recommender 242. In an embodiment the maps 236 provides a real-time view of entity movements (that include request, service request and orders for telecom process flow) across milestones as well as cluster view of segmentation based on their statistical likelihood across significant process flow milestones as shown in FIG. 8, wherein. The dashboard 238 provides single views of requests along with anomalies as real-time/near real-time report along with of performance of applications, services and infra critical to the success of business transactions. Further the notification generator 240 and the recommendation generator 242 are configured to report deviations from ideal state of digital twin and also triggers alerts to configured end points/third party to ensure preventive actions.

Figure 3A:
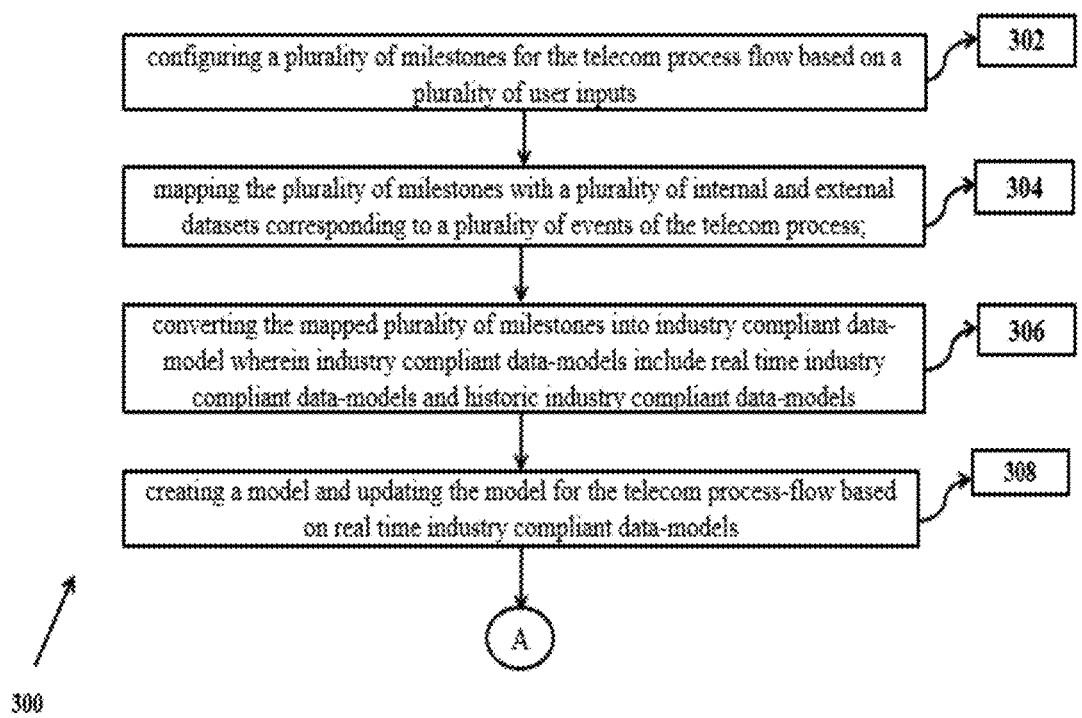
FIG. 3A and FIG. 3B illustrates a flow diagram illustrating a method for pre-emptive deviation detection for a telecom process flow using digital twin, according to an embodiment of present disclosure.
Figure 3B:
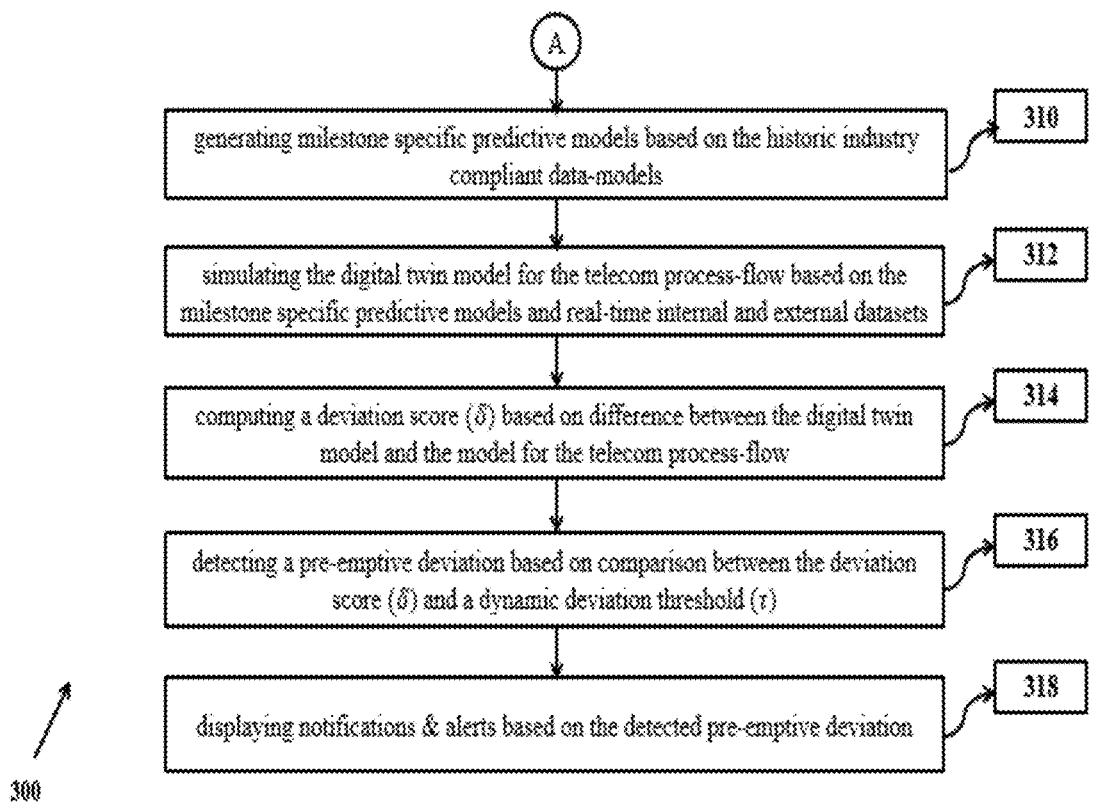

FIG. 3, with reference to FIGS. 1-2, is an exemplary flow diagram 300 illustrating a method for pre-emptive deviation detection for a telecom process flow using digital twin using the system 100 of FIG. 1 according to an embodiment of the present disclosure. In an embodiment, the system 100 comprises one or more data storage devices or the memory 104 operatively coupled to the one or more processors 108 and is configured to store instructions for execution of steps of the method by the pre-emptive deviation detection unit 102. The steps of the method of the present disclosure will now be explained with reference to the components of the system 100 and the modules 302-318 as depicted in FIGS. 1-2, and the flow diagram as depicted in FIG. 3.

At step 302, configuring a plurality of milestones for the telecom process flow based on a plurality of user inputs in the configuration module (202), wherein each individual telecom process-flow further comprises sub-telecom processes wherein each of the sub-telecom process further comprises of distinct plurality of logical milestones with weighted priorities and are configured based on enterprise parameters that include business, IT and network provisioning orchestration design.

At step 304, mapping the plurality of milestones with a plurality of internal and external datasets corresponding to a plurality of events of the telecom process in the configuration module (202). The plurality of datasets are received from an input module (204) that further comprises of external data sources (206) and internal enterprise data sources (208), which are generated from customer process flow events and deviations that includes historical and real-time data, wherein the plurality of datasets are available in one or more of formats.

At step 306, converting the mapped plurality of milestones into industry compliant data-model wherein industry compliant data-models include real time industry compliant data-models and historic industry compliant data-models in the data ingestion module (210). The said method of converting the mapped plurality of milestones into industry compliant data-model is based on the telecom process flow and the configured plurality of milestones and further comprises identifying, extracting, transforming and loading the received datasets based on Extract, Transform and Load (ETL) techniques, statistical correlation and machine learning based unsupervised learning clustering techniques, while considering telecom domain specific features that include infrastructure (IT and network), application stack, operations and process. The industry compliant data-model is saved in a tower-wise event storage (216) database At step 308, creating a model and updating the model for the telecom process-flow based on real time industry compliant data-models in the process flow correlation engine (218).

At step 310, generating milestone specific predictive models based on the historic industry compliant data-models in the hybrid decision engine (224). The milestone specific predictive models are generated by predicting the estimated time of arrival (ETA) at milestones based on supervised techniques, creating process flow event clusters between subsequent milestones based on unsupervised techniques and predicting ETA for subsequent flow event clusters based on supervised regression techniques.

At step 312, simulating the digital twin model for the telecom process-flow based on the milestone specific predictive models and real-time internal and external datasets in the hybrid decision engine (224). The digital twin model is dynamically simulated based on real time internal and external datasets corresponding to a process flow entity by predicting the estimated time of arrival (ETA) at milestones based on supervised techniques, further creating process flow event clusters between subsequent milestones based on unsupervised techniques and finally predicting ETA for subsequent flow event clusters based on supervised regression techniques.

At step 314, computing a deviation score (δ) based on difference between the digital twin model and the model for the telecom process-flow in the deviation detection module (230).

At step 316, detecting a pre-emptive deviation based on comparison between the deviation score (δ) and a dynamic deviation threshold (τ) in the deviation detection module (230). The dynamic deviation threshold (τ) is dynamically computed based on deviation computation at event level, computation of extrapolation deviation at the subsequent milestones while considering weighted priorities of the subsequent milestones.

At step 318, displaying notifications & alerts based on the detected pre-emptive deviation in the display module (234). The notifications are displayed in numerous configurations that include maps, process views, process flow view and alerts to support groups for further corrective actions.

The illustrated steps of method 300 are set out to explain the exemplary embodiments shown, and it should be anticipated that ongoing technological development may change the manner in which particular functions are performed. These examples are presented herein for purposes of illustration, and not limitation.

USE CASE EXAMPLE

Figure 9A:
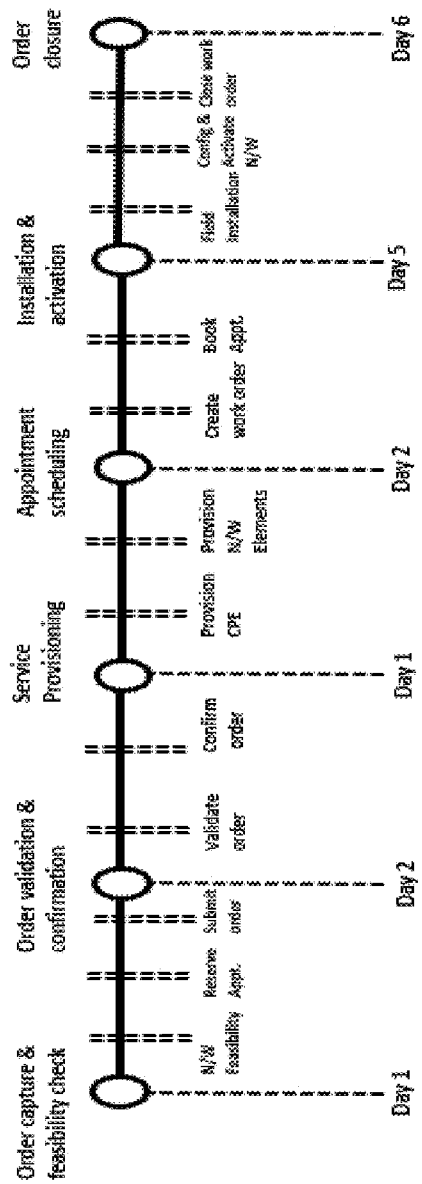

Consider receiving a request for pre-emptive deviation detection for a telecom process flow for telecom fixed line order 'O' as shown in FIG. 9A. The plurality of milestones and events are configured and mapped as shown below;

| Milestones | Milestones Description | Predicted Cycle Time |
|---|---|---|
| M0 | Order Capture & Feasibility Check | Process flow Start |
| M1 | Order Validation & Confirmation | 5-7 minutes |

-continued

| Milestones | Milestones Description | Predicted Cycle Time |
|---|---|---|
| M2 | Service Provisioning | 3-4 hours |
| M3 | Appointment Scheduling | 38-41 hours |
| M4 | Installation & Activation | 4-5 days |
| M5 | Order Closure | 5-6 days |

| Events | Clusters |
|---|---|
| Network Feasibility | CL1E1M1 |
| | CL2E1M1 |
| Reserve Appointment | CL1E2M1 |
| | CL2E2M1 |
| | CL3E2M1 |
| Submit Order | CL1E3M1 |
| Validate Order | CL1E1M2 |
| | CL2E1M2 |
| Confirm Order | CL1E2M2 |
| Provision CPE | CL1E1M3 |
| | CL2E1M3 |
| | CL3E1M3 |
| Provision N/W Elements | CL1E2M3 |
| | CL2E2M3 |
| Create Work Order | CL1E1M4 |
| Book Appointment | CL1E2M4 |
| | CL2E2M4 |
| | CL3E2M4 |
| Field Installation | CL1E1M5 |
| | CL2E1M5 |
| Configure & Activate N/W | CL1E2M5 |
| | CL2E2M5 |
| | CL3E2M5 |
| Close Work Order | CL1E3M5 |

Figure 9C:
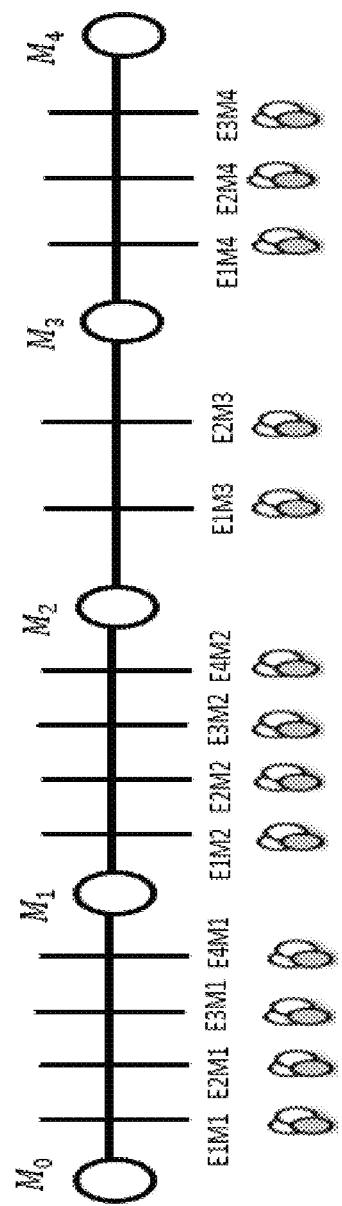

Further based on the milestones and events, milestone specific predictive models are generated based on supervised techniques, creating process flow event clusters between subsequent milestones based on unsupervised techniques and predicting ETA for process entities of same sub-cluster based on supervised regression techniques. Further digital twin model is simulated based on milestone specific predictive models and real time internal and external datasets corresponding to a process flow entity by predicting the estimated time of arrival (ETA) at milestones based on supervised techniques, further creating process flow event clusters between subsequent milestones based on unsupervised techniques and finally predicting ETA for subsequent flow event clusters based on supervised regression techniques as shown in FIG. 9B. Further ETAs are predicted at subsequent events for digital twin model. In an embodiment, the order 'O' is associated with clusters—CL2 at N/W feasibility event, CL3 at Reserve Appt. event, and CL1 at Submit order event. Cluster level regression models provide ETAs of 1 minute, 4 minutes, and 6 minutes at N/W feasibility event, Reserve Appt. event, and Submit order event respectively. The cluster association & ETAs is depicted in FIG. 9C.

Figure 9D:
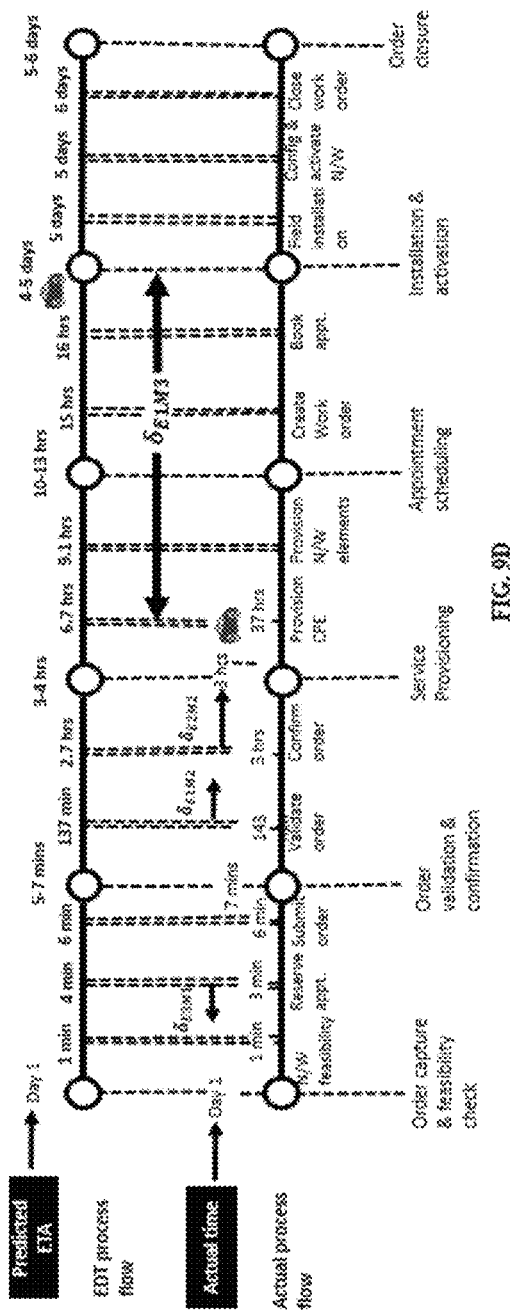

Further simulated digital twin process flow is tracked against the actual process flow and the time deviation is calculated at each event level. The process flow delays are aggregated to measure the overall delivery deviation as shown in FIG. 9D, wherein deviations are continuously detected throughout the telecom process flow by extrapolating the deviations obtained as per the extrapolation of the deviation at milestone. Considering an embodiment, where in deviation at 'M3—Appointment Scheduling', 'M4—Installation & Activation' & 'M5—Order Closure' is calculated as shown below;

$$\delta_{M5} = \Delta_{E1M1C1} + \sum_{i=1;j=1}^{i=5;j=k} \Delta EiMj$$

In an embodiment, considering a worked out example value $\Delta_{E1M1C1}$ as 6 minutes and $\Sigma_{i=1;j=1}^{i=5;j=k} \Delta EiMj$ as 5000 minutes, which results in $\delta_{M5}$ as 5006 minutes. Further, considering a worked example out $\tau_{E1M1C1}$ is 4800 minutes, since the δ is larger than the value of τ, notifications are triggered from notification generator 240 based on recommendations as recommended by recommendation generator 242, wherein recommendations are recommended based on several techniques that include user feedback, machine learning based techniques, rule-based notifications Hence a method and a system for pre-emptive deviation detection for a telecom process flow using digital twin. The proposed method and system pre-emptively detects critical failures in the telecom process flow even before they occur by pre-emptively detecting deviations based on digital twin. The proposed pre-emptive deviation is dynamically detected based on digital twin wherein, a simulated digital twin of telecom process flow is compared with a simulated predicted telecom process flow. Further based on pre-emptively detected deviation, notifications are displayed to execute preventive measures to ensure critical failures are avoided.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for pre-emptive deviation detection of a telecom process flow using a digital twin, comprising:

configuring a plurality of milestones for the telecom process flow based on a plurality of user inputs;

mapping the plurality of milestones with a plurality of internal and external datasets corresponding to a plurality of events of the telecom process;

converting the mapped plurality of milestones into an industry compliant data-model wherein industry compliant data-models include a real time industry compliant data-models and historic industry compliant data-models;

creating a model and updating the model for the telecom process-flow based on the real time industry compliant data-models;

generating milestone specific predictive models based on the historic industry compliant data-models, wherein the milestone specific predictive models are generated by predicting an estimated time of arrival (ETA) at milestones based on supervised techniques, creating process flow event clusters between subsequent milestones based on unsupervised techniques and predicting the ETA for subsequent flow event clusters based on supervised regression techniques;

simulating a digital twin model for the telecom process-flow based on the milestone specific predictive models and the real-time internal and external datasets;

computing a deviation score ($\delta$) based on a difference between the digital twin model and the model for the telecom process-flow;

detecting a pre-emptive deviation based on comparison between the deviation score ($\delta$) and a dynamic deviation threshold ($\tau$); and displaying notifications & alerts based on the detected pre-emptive deviation.

2. The method of claim 1, wherein each of an individual telecom process-flow further comprises sub-telecom processes wherein each sub-telecom process further comprises a distinct plurality of logical milestones with weighted priorities and are configured based on enterprise parameters that include business, IT and network provisioning orchestration design.

3. The method of claim 1, includes a plurality of datasets, wherein the plurality of datasets are received from the real-time internal and external datasets which are generated from customer process flow events and deviations that include historical and real-time data, wherein the plurality of datasets are available in one or more of formats.

4. The method of claim 1, wherein converting the mapped plurality of milestones into the industry compliant data-model is based on the telecom process flow and the configured plurality of milestones and further comprises identifying, extracting, transforming and loading the received datasets based on Extract, Transform and Load (ETL) techniques, statistical correlation and machine learning based unsupervised learning clustering techniques.

5. The method of claim 4, wherein the industry compliant data-model input is clustered into sub clusters of process flow entity and aggregated actionable insights using unsupervised machine learning techniques and displayed to the user.

6. The method of claim 4, wherein the step of transforming industry compliant milestones and the industry compliant events are classified based on telecom domain specific features that include infrastructure (IT and network), application stack, operations and process.

7. The method of claim 1, wherein the digital twin model is dynamically simulated based on real time internal and external datasets corresponding to a process flow entity by predicting the estimated time of arrival (ETA) at milestones based on supervised techniques, further creating process flow event clusters between subsequent milestones based on unsupervised techniques and finally predicting ETA for subsequent flow event clusters based on supervised regression techniques.

8. The method of claim 1, wherein the dynamic deviation threshold ($\tau$) is pre-computed based on deviation computation at event level, computation of extrapolation deviation at the subsequent milestones while considering weighted priorities of the subsequent milestones.

9. The method of claim 1, wherein notifications are displayed in numerous configurations that include maps, process views, process flow view and alerts to support groups for further corrective actions.

10. The method of claim 1, wherein the digital twin model is continuously optimized based on the deviation score and user feedback.

11. A system for pre-emptive deviation detection for a telecom process flow using digital twins, the system (100) comprising:

a configuration module for configuring a milestones based on user inputs and mapping the configured milestones with a plurality of internal and external datasets corresponding to a plurality events of the telecom process;

a data ingestion module for identifying, extracting, transforming and loading the mapped datasets into an industry compliant data-model based on the telecom process flow and the configured milestones;

a process flow correlation engine for creating and dynamically updating an actual model for the telecom process-flow based on real time industry compliant data-models;

a hybrid decision engine for generating a milestone specific predictive models based on historic industry compliant data-models and simulating a digital twin model for the telecom process-flow based on the milestone specific predictive models and the real-time internal and external datasets;

a deviation detection module for computing an deviation score ($\delta$) based on a difference between the digital twin model and the model for the telecom process-flow; and a display module for displaying notifications & alerts based on comparison between the deviation score ($\delta$) and a dynamic deviation threshold ($\tau$).

12. The system of claim 11, further includes an input module (204) that further comprises of external data sources (206) and internal enterprise data sources (208) for receiving a plurality of datasets as input, wherein the plurality of datasets are received from internal enterprise data sources and external data sources.

13. The system of claim 11, further includes saving industry complaint data-model in a tower-wise event storage (216) database.

14. The system of claim 11, wherein a deviation status along with the actual model and corresponding digital twin model are saved in a tower-wise process flow state storage (232) database.

15. One or more non-transitory machine readable information storage mediums comprising one or more instructions which when executed by one or more hardware processors cause:

configuring a plurality of milestones for a telecom process flow based on a plurality of user inputs;

mapping the plurality of milestones with a plurality of internal and external datasets corresponding to a plurality of events of the telecom process;

converting the mapped plurality of milestones into an industry compliant data-model wherein industry compliant data-models include a real time industry compliant data-models and historic industry compliant data-models;

creating a model and updating the model for the telecom process-flow based on the real time industry compliant data-models;

generating milestone specific predictive models based on the historic industry compliant data-models;

simulating a digital twin model for the telecom process-flow based on the milestone specific predictive models and the real-time internal and external datasets;

computing a deviation score (δ) based on a difference between the digital twin model and the model for the telecom process-flow;

detecting a pre-emptive deviation based on comparison between the deviation score (δ) and a dynamic deviation threshold (τ); and displaying notifications & alerts based on the detected pre-emptive deviation.

* * * * *